United States Patent
Haswell

(10) Patent No.: US 10,628,326 B2
(45) Date of Patent: Apr. 21, 2020

(54) LOGICAL TO PHYSICAL MAPPING

(71) Applicant: Micron Technology, Inc., Boise, ID (US)

(72) Inventor: Jonathan M. Haswell, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/681,619

(22) Filed: Aug. 21, 2017

(65) Prior Publication Data

US 2019/0057038 A1 Feb. 21, 2019

(51) Int. Cl.
*G06F 12/1009* (2016.01)
*G06F 12/0804* (2016.01)
*G06F 12/0875* (2016.01)
*G06F 12/10* (2016.01)

(52) U.S. Cl.
CPC ...... *G06F 12/1009* (2013.01); *G06F 12/0804* (2013.01); *G06F 12/0875* (2013.01); *G06F 12/10* (2013.01); *G06F 2212/202* (2013.01); *G06F 2212/65* (2013.01)

(58) Field of Classification Search
None
See application file for complete search history.

(56) References Cited

U.S. PATENT DOCUMENTS

| | | | |
|---|---|---|---|
| 7,251,653 B2 | 7/2007 | Huang et al. | |
| 8,321,652 B2 | 11/2012 | Hinz | |
| 9,229,876 B2 | 1/2016 | Slepon | |
| 9,684,462 B2 | 6/2017 | Beaverson et al. | |
| 2010/0274961 A1 | 10/2010 | Golla et al. | |
| 2012/0203958 A1 | 8/2012 | Jones et al. | |
| 2014/0047164 A1 | 2/2014 | Nemazie | |
| 2014/0281315 A1* | 9/2014 | Danilak | G06F 11/1456 711/162 |
| 2017/0068621 A1* | 3/2017 | Watanabe | G06F 12/0891 |
| 2017/0075811 A1* | 3/2017 | Hsu | G06F 12/0888 |
| 2017/0235681 A1* | 8/2017 | Kaburaki | G06F 12/0292 711/128 |
| 2018/0089076 A1* | 3/2018 | Li | G06F 3/0679 |
| 2018/0121121 A1* | 5/2018 | Mehra | G06F 3/0604 |
| 2018/0239547 A1* | 8/2018 | Inbar | G06F 3/0613 |

FOREIGN PATENT DOCUMENTS

WO 2014055445 A1 4/2014

OTHER PUBLICATIONS

International Search Report and Written Opinion from related international application No. PCT/US2018/046657, dated Dec. 3, 2018, 13 pp.

* cited by examiner

*Primary Examiner* — Charles Rones
*Assistant Examiner* — Ryan Dare
(74) *Attorney, Agent, or Firm* — Brooks, Cameron & Huebsch, PLLC

(57) ABSTRACT

The present disclosure includes apparatuses and methods for logical to physical mapping. A number of embodiments include a logical to physical (L2P) update table, a L2P table cache, and a controller. The controller may be configured to cause a list of updates to be applied to an L2P table to be stored in the L2P update table.

18 Claims, 4 Drawing Sheets

LOGICAL TO PHYSICAL MAPPING

TECHNICAL FIELD

The present disclosure relates generally to semiconductor memory and methods, and more particularly, to logical to physical mapping.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include storage memory such as NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

DETAILED DESCRIPTION

Figure 1:
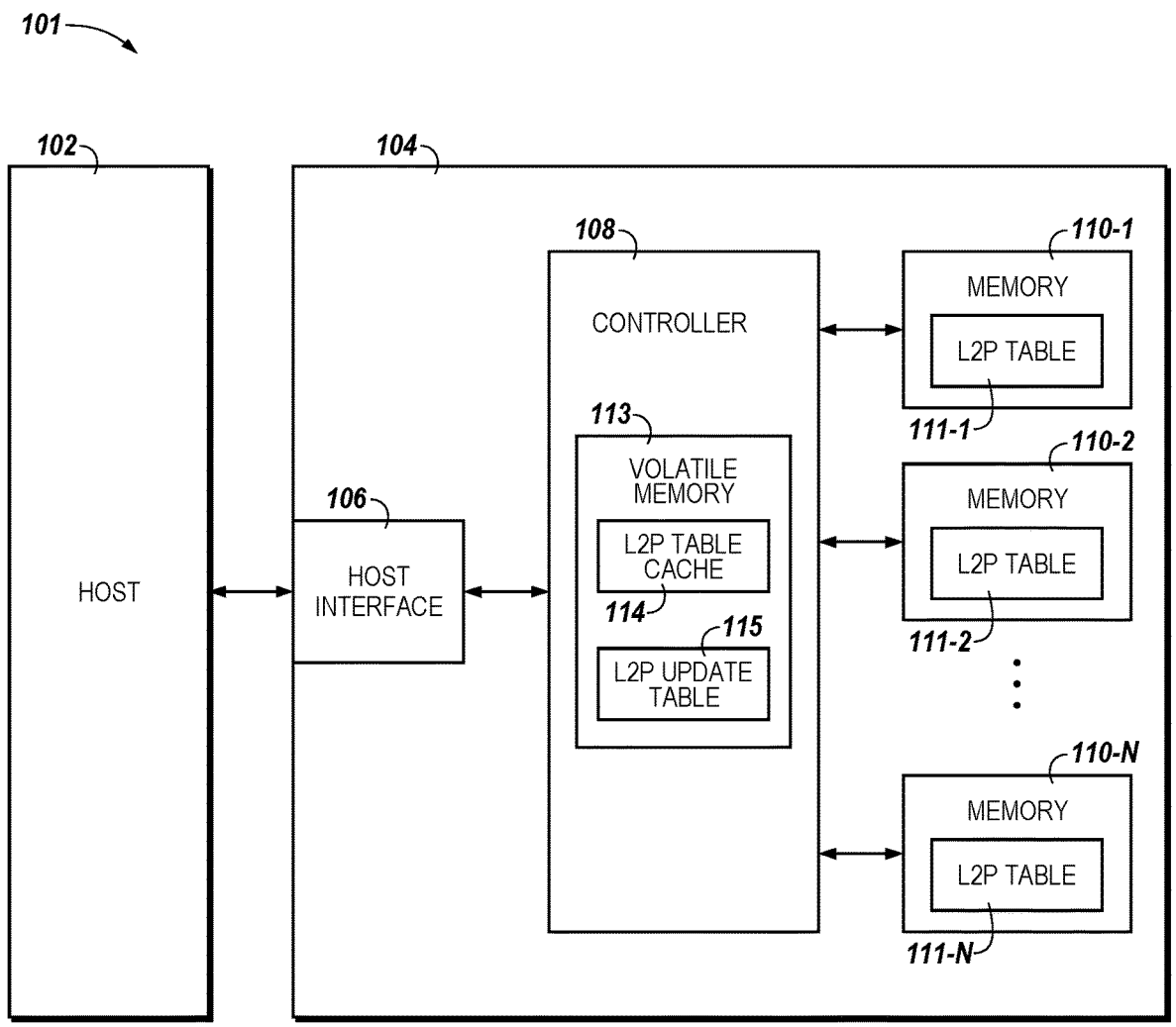
FIG. 1 is a functional block diagram of an apparatus in the form of a computing system comprising a memory system in accordance with a number of embodiments of the present disclosure.

A host system will address blocks of data stored on an SSD using a logical address. The data will be stored in the SSD at a physical address in the non-volatile memory. The controller of the SSD often maintains a table to map from the logical address used by the host to the physical address where the data is stored. This table is referred to as the L2P table. When the host wishes to read data the SSD will look up the physical address in the L2P table, in order to fetch the data requested. When the host writes or updates data in the SSD the L2P table will be updated. The L2P table will itself be stored in the non-volatile memory of the SSD but to be used or updated by the SSD controller it must be first fetched into volatile memory, in or attached to the SSD controller. If the L2P table is updated then the updates must, at some point, be written back into the table stored in non-volatile memory. During the design process of an SSD it must be determined if the volatile memory in or attached to the controller will be specified to hold the complete L2P table for the entire logical address space of the SSD, or if less volatile memory will be specified and only portions of the L2P table from the non-volatile memory can be loaded into the controller memory at a time, (i.e., using the controller non-volatile memory as a cache for the L2P table).

Apparatuses and methods for improved logical to physical mapping are provided herein. In one or more embodiments of the present disclosure, an apparatus may include a logical to physical (L2P) update table, a L2P table cache, and a controller. The controller may be configured to cause a list of updates to be applied to an L2P table to be stored in the L2P update table.

Logical block addressing is a scheme that can be used by a host for identifying a logical region of data. A logical address from the host is translated into a translation unit (TU), which is the smallest unit of non-volatile memory managed by the L2P table. Each TU in the L2P table may be placed at a unique location in non-volatile memory. Additionally, a TU may also correspond to a physical address. A logical region of data can be a number of bytes of data (e.g., 256 bytes, 512 bytes, or 1,024 bytes). However, embodiments are not limited to these examples.

The use of a part of the volatile memory as a cache for the L2P table, as opposed to requiring sufficient volatile memory to load the entire table at one time, allows less volatile memory (e.g., DRAM or SRAM), to be required. However there is a performance penalty on the overall device due to the need to load portions, referred to as regions, of the L2P table into the cache and to write updated portions from the volatile memory back to the non-volatile memory on a more frequent basis than if the entire table could reside in volatile memory at one time.

Depending on the exact ratio of volatile to non-volatile memory, the time impact of L2P caching may be modified, for example, due to cache hits; however, for large SSDs, the cache hit ratio may be small. A number of embodiments of the present disclosure can provide benefits such as increasing the efficiency of L2P caching (e.g., by effectively increasing the cache hit rate of an L2P caching scheme).

Various embodiments described herein can provide an L2P caching approach in which an amount of volatile memory (e.g., DRAM or SRAM) available for L2P caching is divided into a plurality of portions. For example, the amount of volatile memory available for the L2P map may be divided into an L2P Table Cache portion and a L2P Update portion. The L2P Table Cache portion holds, at any point in time, a subset of the full L2P Table as a cache. Regions of the L2P Table are loaded into this cache as required to be read and updated, and those regions when updated will be written back to the L2P Table in non-volatile memory. The L2P Update portion contains a list of updates to be applied to the L2P table but have not yet been applied (i.e., the region of the table they apply to have not yet been read into the cache, modified and then written back out to non-volatile memory).

Further, embodiments herein may allow for updates that are stored in the L2P update portion to be sorted into hash tables (e.g., buckets) on a per L2P region basis, which may allow for the updates applied to an L2P region to be determined based on a read of the contents of the hash table in which the updates to L2P entries are located. This may allow for faster processing of updated L2P entries and/or may increase the efficiency of an L2P update process because, in at least one embodiment, only the hash table in which the updated L2P entries are located may be read as opposed to some approaches which may require a large data structure to be searched to find relevant updated L2P entries. For example, the L2P update process may be more efficient versus some previous approaches. In at least one embodiment, updated L2P entries may require only a single volatile memory read to be accessed in contrast to approaches in which an entire L2P region is read from the non-volatile memory to the volatile memory, and subsequently read from the volatile memory by the processor.

As used herein, "a number of" something can refer to one or more such things. For example, a number of memory cells can refer to one or more memory cells. Additionally, the designator "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 114 in FIG. 2.

FIG. 1 is a functional block diagram of an apparatus in the form of a computing system 101 comprising a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

Memory system 104 can be, for example, a solid state drive (SSD). In the embodiment illustrated in FIG. 1, memory system 104 includes a host interface 106, a memory (e.g., a number of memory devices 110-1, 110-2, . . . , 110-N) serving as a storage volume for system 104, and a controller 108 (e.g., an SSD controller) coupled to host interface 106 and memory devices 110-1, 110-2, . . . , 110-N. Memory devices 110-1, 110-2, . . . , 110-N can include, for example, a number of non-volatile memory arrays.

The non-volatile arrays can be flash arrays with a NAND architecture, phase change arrays, etc., for example. Embodiments are not limited to a particular type of memory array or array architecture.

In operation, data can be written to and/or read from a memory device of a memory system (e.g., memory devices 110-1, . . . , 110-N of memory system 104) as a page of data, for example. As such, a page of data can be referred to as a data transfer size of the memory system. Data can be transferred to/from a host 102) in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

Host interface 106 can be used to communicate information between memory system 104 and another device such as a host 102. Host 102 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

Host interface 106 can be in the form of a standardized physical interface. For example, when memory system 104 is used for information storage in computing system 101, host interface 106 can be a serial advanced technology attachment (SATA) physical interface, a peripheral component interconnect express (PCIe) physical interface, or a universal serial bus (USB) physical interface, among other physical connectors and/or interfaces. In general, however, host interface 106 can provide an interface for passing control, address, information (e.g., data), and other signals between memory system 104 and a host (e.g., host 102) having compatible receptors for host interface 106.

Controller 108 can include, for example, control circuitry and/or logic (e.g., hardware and firmware). Controller 108 can be included on the same physical device (e.g., the same die) as memories 110-1, 110-2, . . . , 110-N. For example, controller 108 can be an application specific integrated circuit (ASIC) coupled to a printed circuit board including physical host interface 106 and memories 110-1, 110-2, . . . , 110-N. Alternatively, controller 108 can be included on a separate physical device that is communicatively coupled to the physical device that includes memories 110-1, 110-2, . . . , 110-N. In a number of embodiments, components of controller 108 can be spread across multiple physical devices (e.g., some components on the same die as the memory, and some components on a different die, module, or board) as a distributed controller.

Controller 108 can communicate with memory devices 110-1, 110-2, . . . , 110-N to sense (e.g., read), program (e.g., write), and/or erase information, among other operations. Controller 108 can have circuitry that may be a number of integrated circuits and/or discrete components. In a number of embodiments, the circuitry in controller 108 may include control circuitry for controlling access across memory devices 110-1, 110-2, . . . , 110-N and/or circuitry for providing a translation layer (e.g., a flash translation layer) between host 102 and memory system 104.

The system 104 also includes volatile memory 113 coupled to controller 108. The volatile memory 113 may be internal to the controller or externally attached to it. Although described as volatile memory, in some embodiments it is also possible that memory 113 might be non-volatile. Within this volatile memory 113 are allocated a portion of space for a L2P Table cache 114. Additionally, a portion of the volatile memory 113 is allocated to a L2P Update table 115.

The L2P Table Cache 114 portion of the Volatile memory 113 may be used by the controller to load regions of the L2P Table 111-1, . . . , 111-N from one or more of the memory devices 110-1, . . . , 110-N. If while loaded into the L2P Table Cache 114 the entries are modified then the modified entries will be written back out to the L2P Tables 110-1 ... 110-N in the non-volatile memories 110-1 ... 110-N at a frequency and rate determined by the controller 108.

In some embodiments the L2P Update table 115 will be divided up into a set of hash tables. For example, the L2P Update table 115 can maintain a hash table for each region of the L2P Table 111-1, ..., 111-N.

When, as a result of a host 102 write operation the controller 108 needs to update an entry in the L2P table 110-1, ..., 110-3 which is not contained in a region currently loaded into the L2P Table Cache 114 then, to avoid the immediate overhead of loading the L2P region, modifying it and immediately writing it back to the L2P Table in the non-volatile memory 110-1, ..., 110-3 it will simply insert an entry in the L2P Update volatile memory 113 in the hash table that corresponds to the region of the L2P table, with the L2P Table to be updated later from this information.

By using the L2P Update volatile memory hash tables to hold updates required, the actual operations to the non-volatile memory 110-1 ... 110-N can be deferred until there are multiple updates for a region of the L2P table pending. Then when this L2P table region is loaded from the L2P table 110-1 ... 110-N into the L2P Table Cache 114 all the updates can be applied at one time before the L2P region is written back to the L2P table 111-1, ..., 111-N. This can significantly reduce the number of read and write operations required of the non-volatile memory 110-1 ... 110-N to update the L2P Table 110-1, ..., 110-N.

Figure 2:
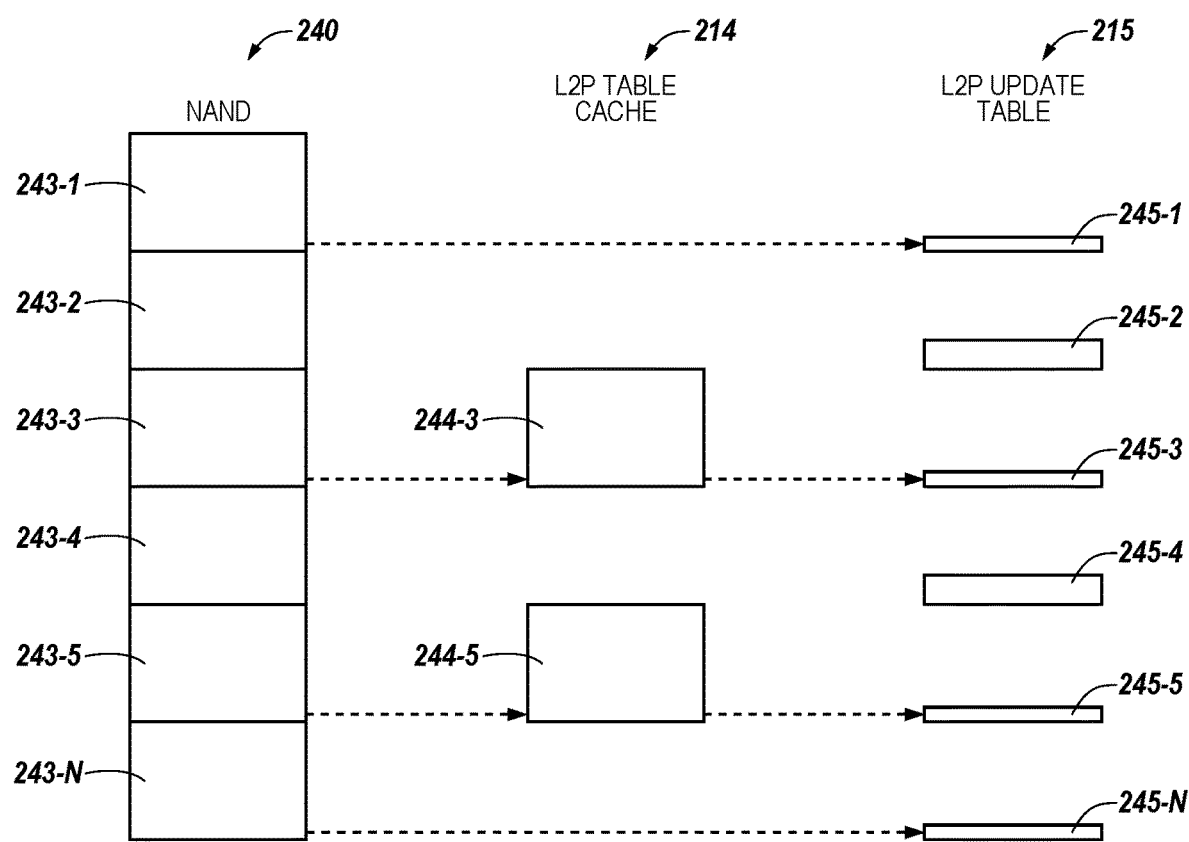
FIG. 2 illustrates an example of logical to physical mapping structure in accordance with a number of embodiments of the present disclosure.

FIG. 2 illustrates an example of logical to physical mapping structure in accordance with a number of embodiments of the present disclosure. As shown in FIG. 2, the total space allocated to L2P mapping on the drive is divided into a plurality of regions 243-1, ..., 243-N to facilitate caching. The number of regions may be based on the total size of the SSD. For example, a SSD with a large storage capacity (e.g., 16,000 terabytes (TB)), there may be thousands of such regions.

The full L2P table 243-1, ..., 243-N is stored in the NAND 240. At any point in time a number of regions of this table may be cached in volatile memory (e.g., volatile memory 113 shown in FIG. 1) in the L2P Table Cache 214. The specific L2P regions stored in the cache will vary over time, based on the commands sent from the host system and/or internal operations of the SSD controller.

Also stored in the controller volatile memory will be the L2P Update data structure 215, which may be hash tables 245-1, ..., 245-N. There will be a table for each L2P region 243 whether that region is currently loaded into the L2P Table Cache or not. The hash tables in the L2P Update structures may have a fixed size or be dynamically allocated.

In response to an L2P entry being updated, for example, in response to a translation unit (TU) update to an L2P entry, the TU may be added with its new location to the hash table 245-1, ..., 245-N allocated to the L2P update portion 215. The update to the L2P entry may be caused by a TU being written to a new physical non-volatile memory location (e.g., address). In some embodiments, the TU update may result from garbage collection operations, from a host write, or form other operation that may require an update to a L2P entry.

In some embodiments, the size of the hash table 245-1, ..., 245-N corresponding to a particular NAND region 114-1, ..., 243-N, the number of entries in each particular hash table 245-1, ..., 245-N may vary. For example, because the only entries in each hash table 245-1, ..., 245-N are entries corresponding to TUs that have been updated by host writes or garbage collection operations, the size of each respective hash table 245-1, ..., 245-N can vary based on how many TU updates have occurred. In some embodiments, this may allow for an increase in the likelihood of coalescing writes, because each has table 245-1, ..., 245-N only stores updated TUs corresponding to the respective NAND region 243-1, ..., 243-N associated therewith. In addition, because TUs may store information in a more dense manner than in some approaches, a greater number of L2P updates may be stored in volatile memory as compared to some approaches. Further, by storing a greater number of updates in volatile memory, the frequency that data is flushed to the non-volatile may be reduced as compared to some approaches.

In some embodiments, a large number of lookups may be performed in the hash tables 245-1, ..., 245-N. In order to facilitate the large number of lookups in an efficient manner, various hashing mechanisms may be used. For example, a cuckoo hashing mechanism in which hash collisions are resolved for values of hash functions in a table such as hash tables 245-1, ..., 245-N may be used. In some embodiments, using a cuckoo hashing mechanism in conjunction with the disclosed L2P mapping may allow for utilization of approximately 91% of the hash table 245-1, ..., 245-N. An example of a cuckoo hashing mechanism may include using three hashes with a single table. For example, there may be three possible locations for each entry in the hash table 245-1, ..., 245-N. Embodiments are not limited to using cuckoo hashing mechanisms, however, and other hashing mechanisms such as multiplicative hashing mechanism may be used.

Figure 3:
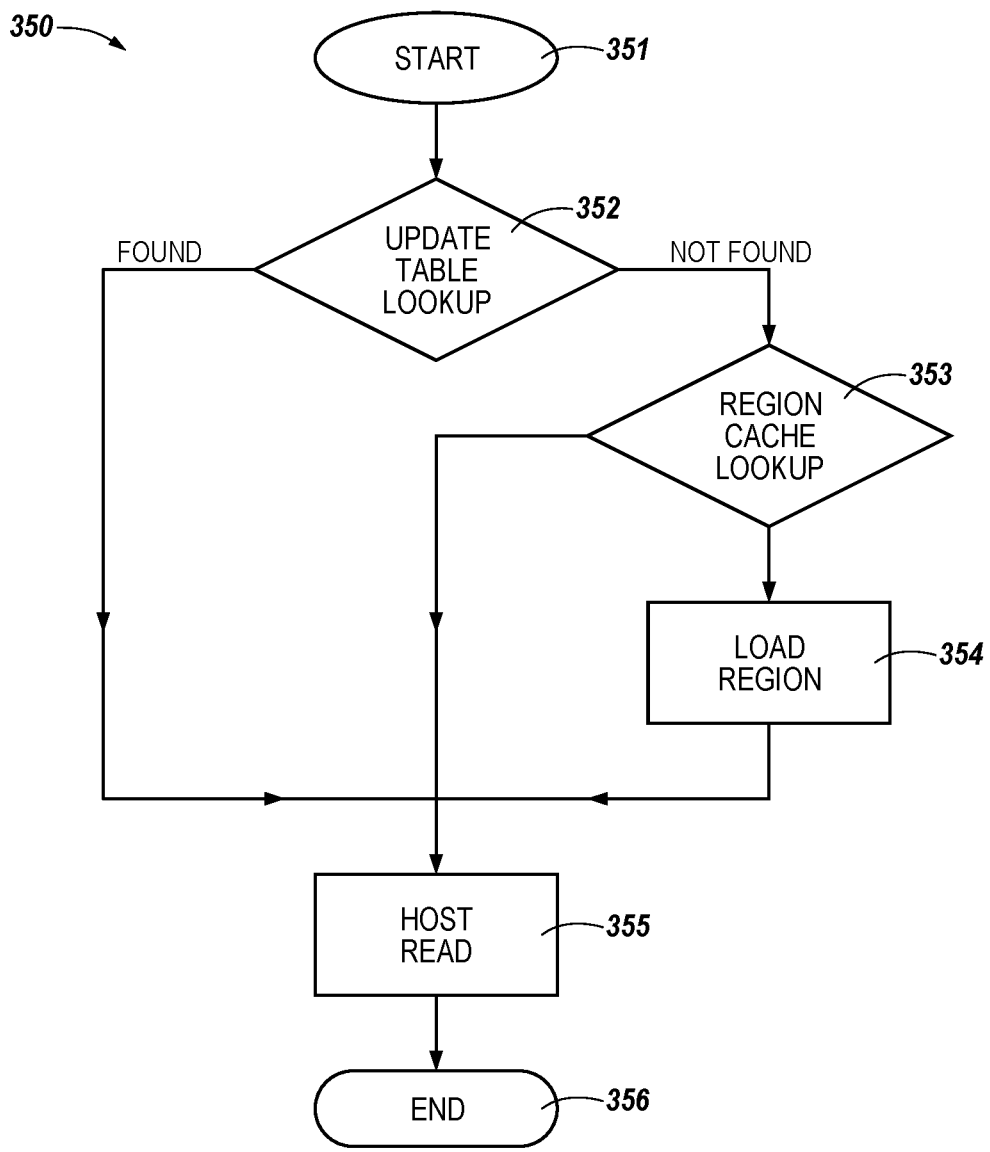
FIG. 3 illustrates a flow diagram for performing host reads in association with logical to physical mapping in accordance with a number of embodiments of the present disclosure.

FIG. 3 illustrates a flow diagram 350 for performing host reads using a logical to physical map in accordance with a number of embodiments of the present disclosure. In some embodiments, performing host reads according to the present disclosure includes first checking the L2P Update portion to determine if it contains information regarding the physical location of the TU that contains the data the host is requesting. If there are no recently updated TUs stored in the L2P Update portion, the L2P Table Cache may be checked to determine if the data to be read is stored therein. If the data to be read is not within a region of the L2P Table Cache currently loaded in volatile memory then it will be required to be loaded from the non-volatile memory L2P Table.

At 351, the process of performing a host read according to the present disclosure is started by performing an L2P Update table lookup at block 352. Performing the update table lookup 352 may include searching entries in the L2P Update portion to determine if a recently updated TU corresponding to the data to be read by the host is present. In some embodiments, searching the entries in the L2P update portion may include searching hash tables included in the L2P Update portion determine if a recently updated TU corresponding to the data to be read by the host is present. If the entry that is sought for the host read is located in the L2P Update portion, e.g., if the entry that is sought is "found," at 355 the host read operation is performed and the process is ended at block 356.

If the entry that is sought for the host read is "not found," an L2P Table Cache lookup may be performed at block 353. Performing the L2P Table Cache lookup at 353 may include searching entries in the L2P Table Cache to determine if the entry to be read by the host is stored in the L2P Table Cache. If the entry is found, the host read operation is performed at the physical non-volatile location specified in the L2P table at block 355, and the process of performing the host read operation ends at blocks 356.

However, if the entry is not found in the L2P Update portion or the L2P Table Cache, a load region operation may be performed at block 354. The load region operation may include loading a L2P region stored on the non-volatile memory. Once loaded the L2P region may subsequently be searched to locate the entry that is sought for the host read. After the L2P region stored on the non-volatile memory is loaded, the host read operation may be performed at the physical non-volatile location specified in the L2P table at block 355, and the process of performing the host read operation ends at block 356. In some embodiments, if additional space is required in the L2P Table Cache, regions which have previously been loaded may be discarded, if they have no updates, or else written back to non-volatile memory if they have been updated, to free up additional space in the L2P region cache.

Figure 4:
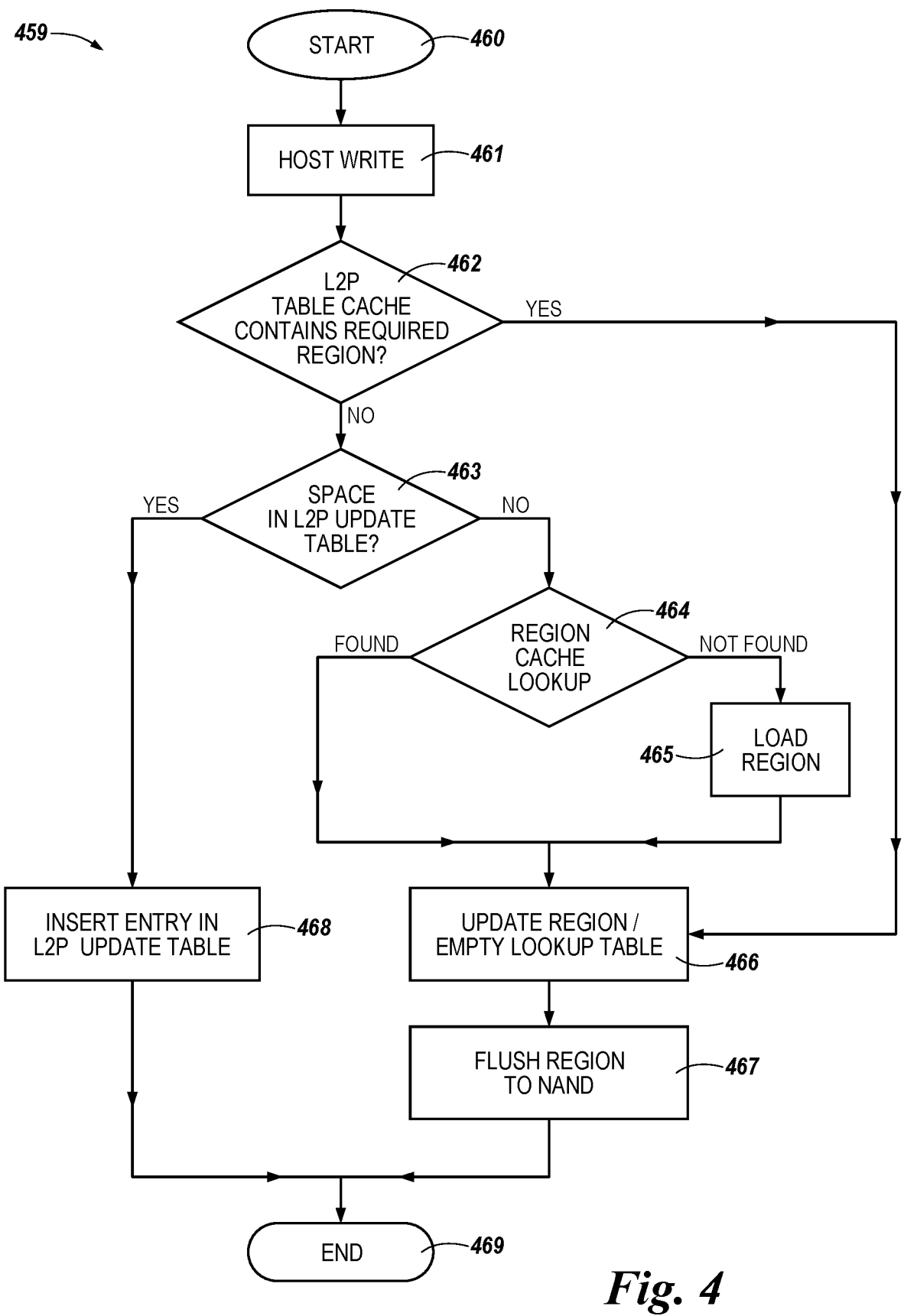
FIG. 4 illustrates a flow diagram for performing host writes in association with logical to physical mapping in accordance with a number of embodiments of the present disclosure.

FIG. 4 illustrates a flow diagram 459 for performing host writes using a logical to physical map in accordance with a number of embodiments of the present disclosure. It is noted that garbage collection operations are performed in a similar manner to the host write process described in FIG. 4. At 460, the process of performing a host write operation according to the present disclosure is started by performing a write of the data from the host to an available empty location in the non-volatile memory at block 461. Note that in some implementations this actual write of the host data to the non-volatile memory array may be deferred due to the use of caches for the host data.

At block 462, a determination may be made as to whether the L2P Table cache contains the required region addressing the logical address of the host written data. For example, a determination may be made at block 462 as to whether the L2P Table cache already has the required region has previously been loaded into the L2P Table cache. If the region is already loaded into the L2P Table cache (e.g., the YES branch of block 462), it is not necessary to add the update to the L2P Update table, and the flow may continue to block 466, which is described in more detail below. However, if the L2P Table cache does not contain the required region (e.g., the NO branch of block 462), the flow may continue to block 463.

At block 463, a determination can be made whether there is space in the L2P Update table. For example, at block 463, a determination can be made as to whether the L2P Update portion contains enough available space to receive an updated TU resulting from the host write operation. If there is enough space in the L2P Update portion to receive the updated TU, at 468 the entry may be inserted into the L2P Update table, and at block 469 the process of performing a host write may end. In some embodiments, the entry may be inserted at block 468 into a hash table included in the L2P map portion.

If there is not enough space in the update table to store the updated TU, an L2P Table Cache lookup can be performed at block 464 to determine if the appropriate region is currently loaded in the cache. Performing the region cache lookup may include searching the L2P table cache to determine if a corresponding entry is stored therein. If a corresponding entry is not found, at block 464 the L2P Table Cache region will be loaded from the non-volatile memory at 465. Note space may have to be created in the volatile memory to do this by discarding or writing back to non-volatile memory another region of the L2P Table.

Once the appropriate region of the L2P Table is loaded into the L2P Table cache it can then be updated with all relevant entries for that region in the L2P Update table in addition to the update required for this host write operation at 466. Once it has been updated the region will then be written back to the L2P Table stored in non-volatile memory at 467. Note this writing back to non-volatile memory may be immediate or delayed. Once the region in the L2P Table Cache has been updated and optionally written back to non-volatile memory the table updates required for a host write may end at 469.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a volatile memory comprising a logical to physical (L2P) update table and a L2P table cache; and
    a controller, wherein the controller is configured to:
        cause a list of updates to be applied to an L2P table to be stored in the L2P update table;
        cause an updated translation unit (TU) to be added to the L2P update table responsive to a determination that there is space in the L2P update table to receive the updated TU;
        cause a region cache lookup to be performed in the L2P table cache to determine whether a particular updated TU is stored in the L2P table cache responsive to a determination that there is not space in the L2P update table to receive the particular updated TU; and
        cause a region of an L2P table stored in non-volatile memory coupled to the volatile memory to be loaded into the L2P table cache responsive to a determination that the particular updated TU is not stored in the L2P table cache.

2. The apparatus of claim 1, wherein the L2P update table and the L2P table cache comprise portions of a volatile memory coupled to the controller.

3. The apparatus of claim 1, wherein the L2P table cache is configured to store a portion of the L2P table stored in the non-volatile memory.

4. The apparatus of claim 1, wherein the controller is configured to cause:

data corresponding to L2P entries that have been updated to be stored in the L2P update table; and data corresponding to L2P regions from the L2P table in the non-volatile memory to be stored in the L2P table cache to facilitate lookup and update operations of the L2P table stored in the non-volatile memory by the controller.

5. The apparatus of claim 1, wherein the controller is further configured to cause the L2P table cache to be used as a buffer to read L2P regions from a non-volatile memory storage of the L2P table stored in the non-volatile memory.

6. The apparatus of claim 1, wherein the controller is further configured to cause a search to be performed in the L2P table cache for a location of a data entry requested by a host responsive to a determination that the data entry is not stored in the L2P update table.

7. The apparatus of claim 1, wherein the L2P update table comprises a plurality of hash tables, wherein each hash table among the plurality of hash tables corresponds to a particular L2P region.

8. The apparatus of claim 1, wherein the controller is configured to cause the L2P entries stored in the L2P update table to be written using a single dynamic random access memory access command.

9. A method, comprising:
determining whether there is space in a logical to physical (L2P) update table to receive an updated translation unit (TU) resulting from a host write operation;
adding the updated TU to the L2P update table responsive to the determination that there is space in the L2P update table to receive the updated TU;
performing a region cache lookup in an L2P table cache to determine whether the updated TU is stored in the L2P table cache responsive to a determination that there is not space in the L2P update table to receive the updated TU; and
causing a region of an L2P table stored in non-volatile memory coupled to the L2P update table and the L2P table cache to be loaded into the L2P table cache responsive to a determination that the updated TU is not stored in the L2P table cache.

10. The method of claim 9, further comprising performing a region cache lookup in a L2P table cache to determine whether the updated TU is stored in the L2P table cache responsive to determining that there is not space in the L2P update table to receive the updated TU.

11. The method of claim 10, further comprising loading a region from a L2P table into the L2P table cache responsive to determining that the updated TU is not stored in the L2P table cache.

12. The method of claim 9, further comprising:
loading a region from the L2P table stored in the non-volatile memory into the L2P table cache responsive to determining that the updated TU is not stored in the L2P table cache; and
updating the L2P table cache with entries loaded in the L2P update table.

13. The method of claim 12, further comprising writing the updated L2P update table to the L2P table cache to update entries stored therein.

14. A method, comprising:
determining whether a particular entry is stored in a logical to physical (L2P) update table;
reading data associated with the particular entry in response to the determination that the particular entry is stored in the L2P update table;
adding an updated translation unit (TU) to the L2P update table responsive to a determination that there is space in the L2P update table to receive the updated TU; and
performing a region cache lookup in an L2P table cache to determine whether the updated TU is stored in the L2P table cache responsive to a determination that there is not space in the L2P update table to receive the updated TU; and
causing a region of an L2P table stored in non-volatile memory coupled to the L2P update table and the L2P table cache to be loaded into the L2P table cache responsive to a determination that the updated TU is not stored in the L2P table cache.

15. The method of claim 14, further comprising:
determining whether the particular entry is stored in a L2P table cache in response to determining that the particular entry is not stored in the L2P update table; and
reading data associated with the particular entry in response to the determination that the particular entry is stored in the L2P table cache.

16. The method of claim 14, wherein the particular entry has been updated within a threshold period of time.

17. The method of claim 14, further comprising determining whether the particular entry is stored in a hash table associated with the L2P update table as part of the determination that the particular entry is stored in the L2P update table.

18. The method of claim 14, wherein the particular entry has been updated since a last garbage collection operation was performed.

* * * * *